(12) United States Patent
Pace et al.

(10) Patent No.: US 10,040,590 B2
(45) Date of Patent: *Aug. 7, 2018

(54) CONTAINER HANDLING MACHINE AND METHOD

(71) Applicant: Sidel S.p.A. CON SOCIO UNICO, Parma (IT)

(72) Inventors: Raffaele Pace, Parma (IT); Stefano Molinari, Parma (IT); Matteo Vignali, Parma (IT)

(73) Assignee: Sidel S.p.A. Con Socio Unico, Parma (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,796

(22) Filed: Nov. 8, 2017

(65) Prior Publication Data

US 2018/0065769 A1    Mar. 8, 2018

Related U.S. Application Data

(63) Continuation of application No. 14/839,381, filed on Aug. 28, 2015.

(30) Foreign Application Priority Data

Aug. 29, 2014 (EP) .................................... 14182771

(51) Int. Cl.
*B65B 57/02* (2006.01)
*B65C 3/26* (2006.01)
(Continued)

(52) U.S. Cl.
CPC .......... *B65B 57/02* (2013.01); *B29C 67/0048* (2013.01); *B65C 3/14* (2013.01);
(Continued)

(58) Field of Classification Search
CPC ......... B29C 67/0048; B29L 2031/7158; B65B 3/12; B65B 57/02; B65B 57/004;
(Continued)

(56) References Cited

U.S. PATENT DOCUMENTS 5,259,913 A     11/1993  Stover et al.
2003/0034111 A1  2/2003  Oldenburg et al.
(Continued)

FOREIGN PATENT DOCUMENTS

DE    10 2008 026244    12/2009
DE    10 2009 025907    12/2010
(Continued)

OTHER PUBLICATIONS

Extended European Search Report dated Feb. 20, 2015 by the European Patent Office in counterpart European Patent Application No. 14182771.7.

*Primary Examiner* — George Koch
(74) *Attorney, Agent, or Firm* — Finnegan, Henderson, Farabow, Garrett & Dunner LLP

(57) ABSTRACT

The invention relates to a container handling machine (1) having at least one operative unit (18) comprising first support means (21) to support a base (12) of a filled and closed container (3), second support means (24) cooperating with an end (17) of the container (3) opposite the base (12), a plunger (31) selectively moved along its axis (E) to perform a deformation operation on the base (12) of the container (3) from a first swollen configuration to a second inwardly-retracted configuration, and actuator means (35) selectively activated to move the plunger (31) along its axis (E) between a first position, detached from the base (12) of the container (3), and a second position, in which the plunger (31) defines the second configuration of the base (12); the machine (1) further comprises a control unit (41) configured to selectively activate the actuator means (35) for moving (Continued)

the plunger (31) along its axis (E); the second support means (24) are maintained at a constant distance from the first support means (21) during the deformation operation; the control unit (41) comprises measuring means (42) for measuring the maximum deforming force (F) exerted by the plunger (31) on the base (12) of the container (3) during the deformation operation in order to determine whether the container (3) is correctly filled.

11 Claims, 4 Drawing Sheets

(51) Int. Cl.
*B29C 67/00* (2017.01)
*B65C 9/04* (2006.01)
*B65C 3/14* (2006.01)
*B29L 31/00* (2006.01)
*B67C 3/22* (2006.01)

(52) U.S. Cl.
CPC ............... *B65C 3/26* (2013.01); *B65C 9/04* (2013.01); *B29L 2031/7158* (2013.01); *B67C 2003/226* (2013.01)

(58) Field of Classification Search
CPC ......... B65B 57/06; B65B 57/08; B65B 61/24; B65C 3/14; B65C 3/26; B65C 9/04; B67C 2003/226; B67C 2003/227; B67C 3/007; B67C 3/045
USPC .......................................................... 156/64
See application file for complete search history.

(56) References Cited

U.S. PATENT DOCUMENTS

| | | |
|---|---|---|
| 2009/0293436 A1 | 12/2009 | Miyazaki et al. |
| 2015/0040515 A1 | 2/2015 | Molinari et al. |
| 2016/0152457 A1 | 6/2016 | Godet et al. |

FOREIGN PATENT DOCUMENTS

| | | |
|---|---|---|
| WO | WO 2006/068511 A1 | 6/2006 |
| WO | WO 2007/127337 A2 | 11/2007 |
| WO | WO 2012/161350 A1 | 11/2012 |
| WO | WO 2013/139874 A1 | 9/2013 |
| WO | WO 2015/039690 A1 | 3/2015 |

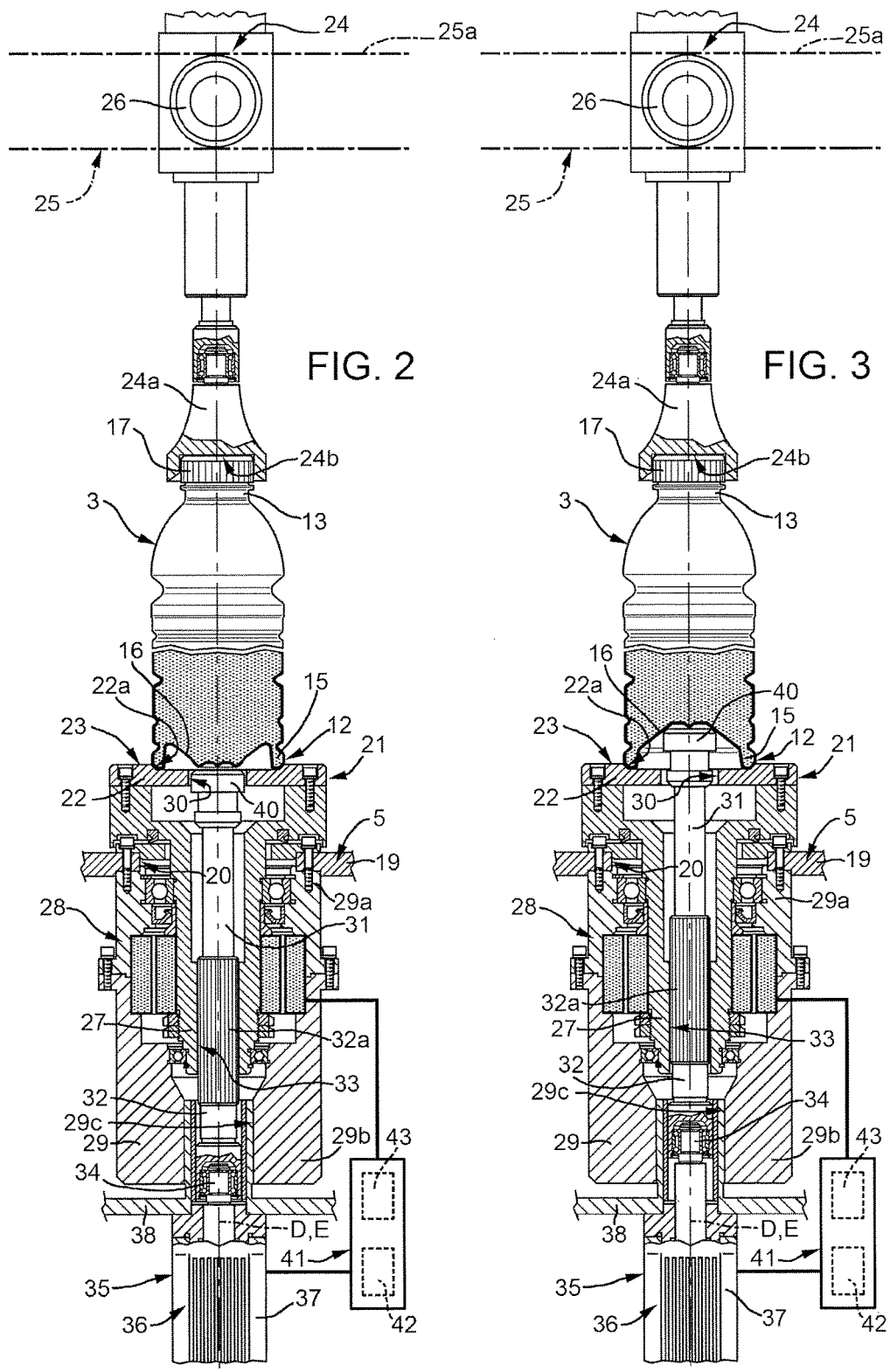

CONTAINER HANDLING MACHINE AND METHOD

CROSS-REFERENCE TO RELATED PATENT APPLICATIONS

This application claims the benefit of priority of U.S. patent application Ser. No. 14/839,381, filed Aug. 28, 2015, now abandoned, which claims the benefit of priority of European Patent Application No. 14182771.7, filed Aug. 29, 2014, the entire contents of which are expressly incorporated herein by reference in their entirety.

TECHNICAL FIELD

The present invention relates to a machine and a method for handling containers, such as for example plastic bottles.

More specifically, the present invention relates to a machine and a method for labelling and transforming filled and closed containers.

The present invention is advantageously but not exclusively applicable in the sector of plastic hot fill containers, which the following description will refer to, although this is in no way intended to limit the scope of protection as defined by the accompanying claims.

BACKGROUND ART

As known, the containers of the above mentioned type, after having been filled with hot—for example at about 85° C.—pourable products or liquids, are first subjected to a capping operation and then cooled so as to return to a room temperature. By effect of the capping operation, the heated air present in the top portion ("head space") of the container expands causing a stress tending to produce a general swelling of the container at the side wall and at the base wall.

The following cooling to which the container is subjected, causes, vice versa, a reduction of the volume of air and minimally of the liquid product contained in the container; a depression is therefore created, which tends to pull the side walls and the base wall of the container inwards. This may determine deformations in the walls of the container if these are not rigid enough to resist the action of the above disclosed stresses.

In order to contain the depressive stresses generated during the cooling of the product within the containers without generating undesired deformations on the containers, they are typically provided, at the side wall, with a series of vertical panels, known as "vacuum panels". These panels, in the presence of depressive stresses, are deformed inwardly of the container allowing it to resist to the hot fill process without generating undesired deformations in other areas of the container.

Likewise, the known containers intended to be subjected to a hot fill process can also have an optimised lower portion or base adapted to be deformed upwards under the action of the depressive stresses.

Even though the disclosed solutions allow to "relieve" the pressure stresses on specific parts of the containers, i.e. the vertical vacuum panels or the base, thus avoiding the occurrence of undesired deformations in other parts of the containers, they do not allow the cancellation of the above said stresses; in other words, the containers remain in any case subject to internal depressive stresses and must therefore be provided with a structure capable of resisting such stresses.

Patent application WO2006/068511 shows a container having a deformable base, which can have two different configurations: a first unstable configuration, in which this base has a central area projecting downwards with respect to the outermost annular peripheral area immediately adjacent thereto, and a second stable configuration, in which the central area is retracted inwardly of the container, i.e. it is arranged in a higher position with respect to the adjacent peripheral area.

Following the filling with the hot pourable product, the base of the container has the first unstable configuration and must be supported by a special cup element to which it is coupled. Thereby, the downward deformation of the base of the container can be maximised without compromising the stable support of the container, since such a support is provided by the cup element. Following the cooling, the base can be deformed by an external action, for example a vertical thrust upwards performed by a rod or plunger, in the second stable configuration with the subsequent possibility of removing the cup element.

The deformation of the base of the container from the first to the second configuration determines a considerable reduction of the containment volume of the container, much higher than would be obtained in the known containers simply by the deformation of the base by the effect of the sole depressive stresses; the final effect is therefore substantially the cancellation of the depressive stresses acting on the inside of the container.

The applicant has observed that this kind of operation is quite critical, as the final configuration of the container after the deformation depends on a plurality of factors, connected not only to the way in which such operation is performed but also to the initial condition of the container subjected to deformation.

In particular, the applicant has observed that a non-correctly filled container, i.e. a container overfilled or filled below the desired level, may react to the deforming action of the plunger in a non predictable way: for instance, an overfilled container may be deformed insufficiently at its base, with possible return of the plastic material towards the original first configuration after release of the plunger; alternatively, a non-sufficiently filled container may be broken by the action of the plunger.

It should be also noted that an incorrect deformation of the container may affect the subsequent application of the label. As known, a label requires a receiving surface having a well-defined geometry as well as a sufficient rigidity. This second feature of the receiving surface is particularly important for self-stick labels or pressure-sensitive labels.

DISCLOSURE OF INVENTION

It is therefore an object of the present invention to find a simple and cost-effective way to check, in a reliable and repeatable manner, the quality of the containers subjected to the deformation operations.

This object is achieved by a container handling machine as claimed in claim 1.

The present invention also relates to a container handling method as claimed in claim 10.

BRIEF DESCRIPTION OF THE DRAWINGS

A preferred embodiment is hereinafter disclosed for a better understanding of the present invention, by mere way of non-limitative example and with reference to the accompanying drawings, in which:

FIG. 2 shows a larger-scale, partial sectional side view of an operative unit of the machine of FIG. 1, in a first condition;

FIG. 3 shows a larger-scale, partial sectional side view of the operative unit of FIG. 2, in a second condition, at the end of a deformation operation on a relative container;

BEST MODE FOR CARRYING OUT THE INVENTION

Figure 1:
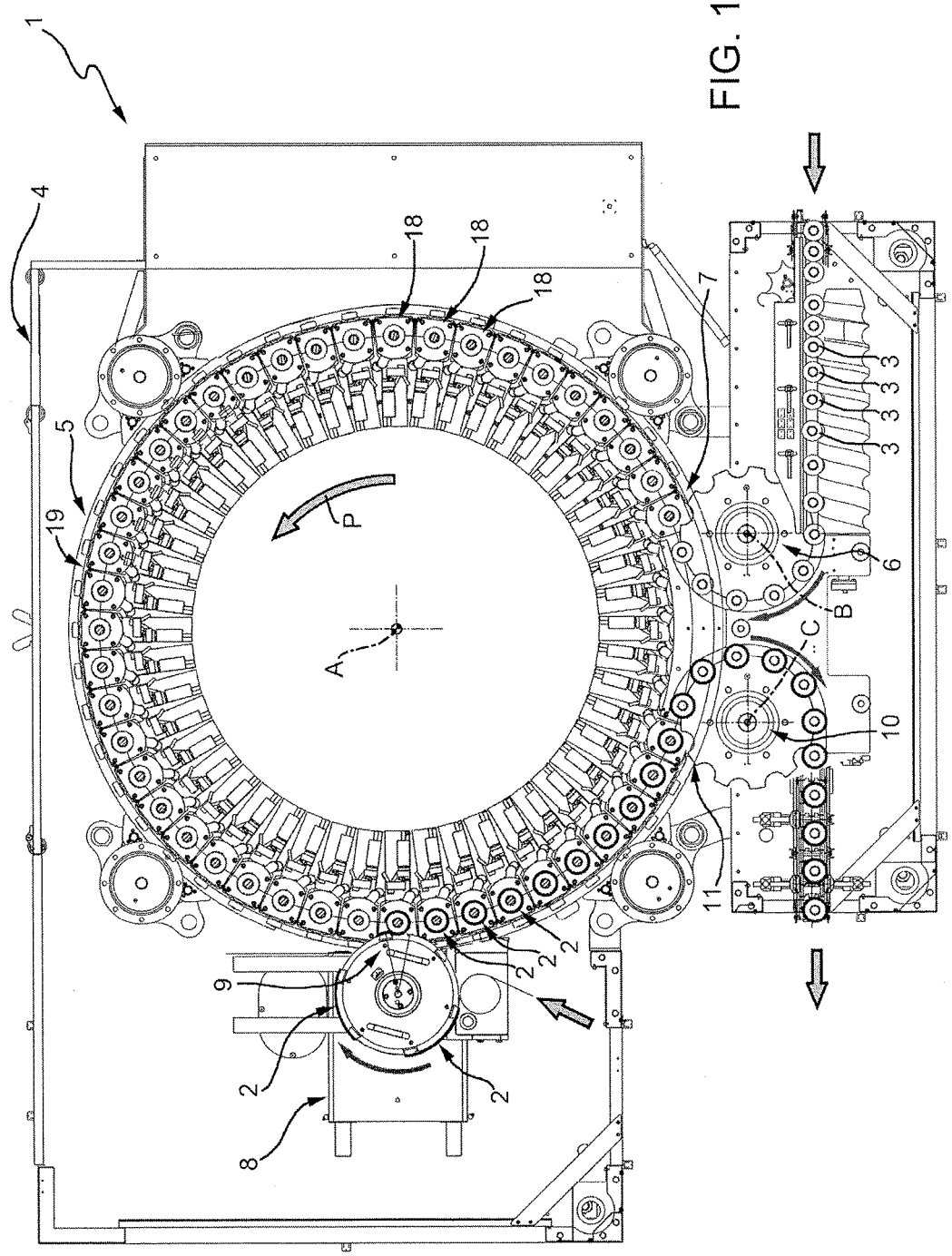
FIG. 1 shows a diagrammatic plan view, with parts removed for clarity, of a container handling machine according to the present invention.

With reference to FIG. 1, numeral 1 indicates as a whole a handling machine for applying labels 2 on filled and closed containers, in particular plastic bottles 3, and for deforming said bottles 3 so as to transform them into a desired final configuration.

Machine 1 essentially comprises a support structure 4 (only partially visible in FIG. 1) and a carousel 5 mounted on support structure 4 in a rotatable manner about a vertical central axis A.

Carousel 5 receives a sequence of bottles 3 to be labelled by an inlet star wheel 6, which cooperates with carousel 5 at a first transfer station 7 and is mounted to rotate about a longitudinal axis B parallel to axis A.

Carousel 5 also receives a sequence of rectangular or square labels 2 from a labelling unit 8 (known per se and only diagrammatically shown), which cooperates with carousel 5 at a second transfer station 9.

Carousel 5 releases a sequence of labelled bottles 3 to an outlet star wheel 10, which cooperates with carousel 5 at a third transfer station 11 and is mounted to rotate about a longitudinal axis C parallel to axes A and B.

As may be seen in detail in FIGS. 2 and 3, each bottle 3 has a longitudinal axis D, a base 12 and a removable cap 17, which is applied on an open neck 13 of the bottle 3 and defines an end of the bottle 3 itself opposite the base 12.

In the case shown, base 12 has an annular peripheral area 15 having axis D, radially external and defining an annular resting surface of relative bottle 3, and a recessed central area 16, surrounded by peripheral area 15 and arranged normally higher along axis D with respect to the peripheral area 15 in a vertical position of bottle 3, i.e. with neck 13 placed above base 12; in other words, central area 16 is arranged at a distance from neck 13 along axis D smaller than the distance between neck 13 and peripheral area 15.

Base 12 is deformable and can have two different configurations, shown in FIGS. 2 and 3. In the first configuration (FIG. 2), central area 16 of base 12 is deformed and swollen downwards, i.e. it is arranged at a maximum distance from neck 13 along axis D so as to define a maximum internal volume of bottle 3; in the second configuration (FIG. 3), reached when the bottle 3 is correctly deformed, central area 16 is instead retracted inwardly of relative bottle 3 with respect to the first configuration, i.e. central area 16 is arranged at a smaller distance along axis D from neck 13 with respect to the first configuration. It is apparent that bottles 3 have, in the second configuration of base 12, a containing volume smaller than that in the first configuration.

Bottles 3 are fed to carousel 5 in a condition in which they have been filled with the pourable product, normally a liquid food product, and closed, at neck 13, with cap 17.

In the case shown, bottles 3 are fed to carousel 5 after having been hot filled and subjected to a cooling operation. Base 12 is therefore arranged in the first configuration, i.e. it is deformed and swollen downwards, and within bottle 3 there are depressive stresses which tend to displace base 12 towards the second configuration.

Bottles 3 reach carousel 5 in a vertical position, i.e. with base 12 arranged on the bottom with respect to neck 13 and to cap 17 and with axis D parallel to axes A, B and C.

Bottles 3 are released to outlet star wheel 10 with base 12 in the second configuration, which is reached when the bottles 3 are correctly deformed and corresponds to the desired final configuration of the bottles 3 themselves.

Carousel 5 comprises a plurality of operative units 18 (only one of which shown in detail in FIGS. 2 and 3), which are uniformly distributed about axis A and are mounted at a peripheral portion of carousel 5.

Operative units 18 are displaced by carousel 5 along a circular processing path P which extends about axis A and through transfer stations 7, 9 and 11. In particular, by considering path P (FIG. 1), transfer station 7, in which bottles 3 are fed to carousel 5, is arranged upstream of transfer station 9 for feeding labels 2, and this latter station is clearly arranged upstream of transfer station 11, in which labelled bottles 3 are fed to outlet wheel 10.

As may be seen in FIGS. 2 and 3, operative units 18 are fixed to a horizontal rotating table 19 of carousel 5, have respective axes E parallel to axes A, B, C and orthogonal to path P, and extend coaxially through respective through-holes 20 of rotating table 19 and on both sides thereof.

Each operative unit 18 is adapted to receive a relative bottle 3 in a vertical position, i.e. having its axis D coaxial to relative axis E with neck 13 placed above base 12, and to retain this bottle 3 in the above said position along path P from transfer station 7 to transfer station 11.

Since operative units 18 are identical to one another, only one will be disclosed in detail hereinafter for clarity and simplicity; it is evident that the features that will be hereinafter disclosed are common to all operative units 18.

In particular, operative unit 18 comprises, above rotating table 19, a resting element 21 adapted to define a horizontal support for base 12 of a relative bottle 3. In greater detail, resting element 21 comprises a plate 22 extending orthogonally to axis E and having, on top, a horizontal resting surface 23 for supporting base 12 of relative bottle 3. In practice, peripheral area 15 is the only part of bottle 3 contacting resting surface 23, being central area 16 retracted along axis D with respect to peripheral area 15 in both first and second configuration of base 12.

Plate 22 is advantageously provided with an upper central recess 22a for receiving base 12 of a relative bottle 3 as well as for centering such bottle 3 with respect to the relative axis E, i.e. with its axis D coaxial to the axis E.

As can be seen in FIGS. 2 and 3, each bottle 3, when housed on the relative operative unit 18, is also locked on top by a retaining unit 24 cooperating with cap 17 of the bottle 3, i.e. with the end of the bottle 3 opposite base 12.

In particular, retaining unit 24 comprises a bottom head 24a defining a receiving seat 24b adapted to be engaged in use by cap 17 of the relative bottle 3.

Retaining unit 24 is advantageously moved along axis E between a retracted or rest position, in which its head 24a is arranged at a maximum distance from resting surface 23 of resting element 21 along the axis E itself, and an advanced or operative position (FIGS. 2 and 3), in which its head 24a is closer to the resting surface 23 than in the rest position and locks the relative bottle 3 in its vertical position on resting element 21.

Displacements of retaining unit 24 between the rest position and the operative position are controlled by a cam 25 fixed to support structure 4 of machine 1, extending parallel to path P and cooperating with a cam follower 26 carried by the retaining unit 24 itself. In particular, cam follower 26 of retaining unit 24 slides along cam 25.

Retaining unit 24 is set in the operative position during movement of operative unit 18 along path P from transfer station 7 to transfer station 11 and is set in the rest position from transfer station 11 to transfer station 7. More specifically, retaining unit 24 is moved from the rest position to the operative position, after a relative bottle 3 is received on resting element 21, and is moved from the operative position to the rest position to release the bottle 3 at transfer station 11.

Figure 4:
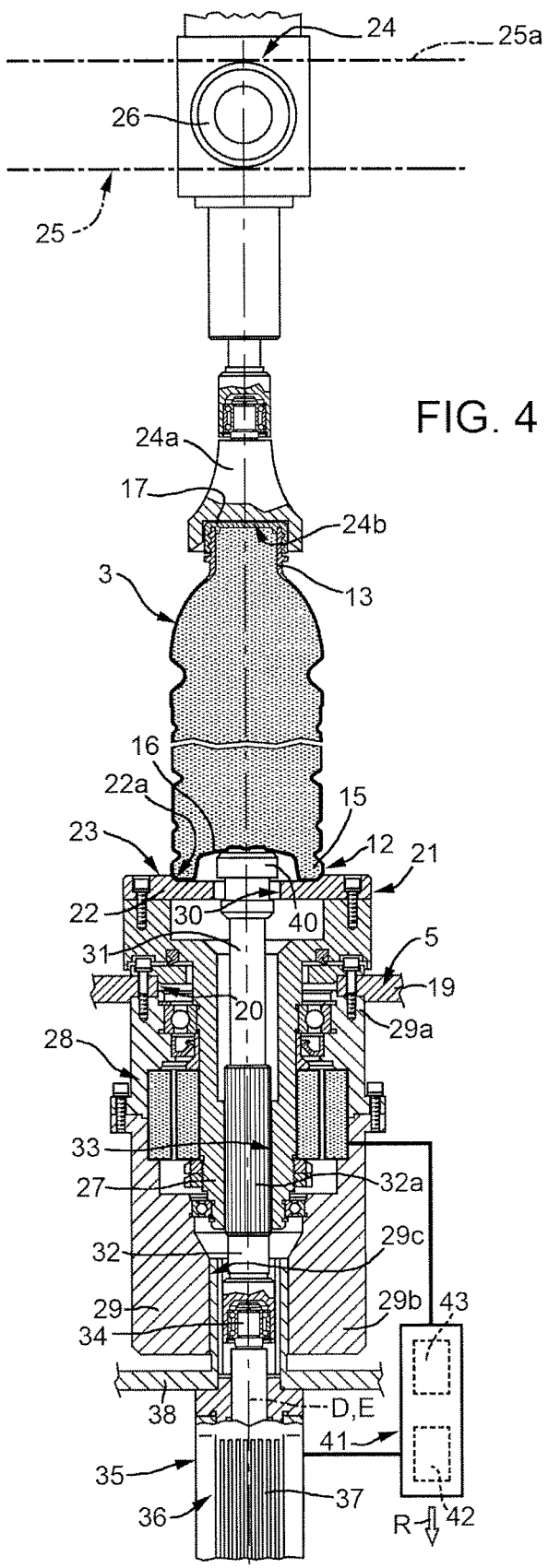
FIG. 4 shows a larger-scale partial sectional side view of the operative unit of FIG. 3 acting on an overfilled container.

In order to produce these movements, cam 25 has, at stations 7 and 11, respective ramp-shaped operative portions (not shown) connected to one another by respective horizontal portions (like the one shown in FIGS. 2 to 4).

Retaining unit 24 is advantageously maintained in its operative position, i.e. with its head 24a at a constant distance along axis E from resting surface 23 of resting element 21 during the deformation operation carried out on base 12 of bottle 3 from the first configuration to the second configuration.

Resting element 21 is also fixed to a rotating member 27 of a relative electric motor 28, so as to be rotated about axis E when relative bottle 3 receives a label 2 from labelling unit 8.

In particular, electric motor 28 comprises a hollow cylindrical stator 29, protrudingly fixed to the lower side of rotating table 19 about hole 20 and coaxially thereto; more precisely, stator 29 has a top end 29a fixed to a lower face of rotating table 19 and protrudes on the lower side of rotating table 19.

Rotating member 27, also cylindrical and hollow, is mounted for the most part within stator 29 and projects on top therefrom so as to engage coaxially and pass through hole 20 of rotating table 19 of carousel 5. Rotating member 27 is mounted in a rotatable manner about axis E with respect to stator 29 and to rotating table 19; in other words, rotating member 27 rotatingly engages hole 20 of rotating table 19.

Resting element 21 finally protrudes from the top of rotating member 27.

Plate 22 of resting element 21 has a through opening 30 coaxial to axis E, and operative unit 18 also comprises a plunger 31, which is borne by rotating table 19 of carousel 5, on the opposite side of resting element 21 with respect to bottle 3, and is selectively displaceable along axis E, with respect to the resting element 21, to act, through opening 30, on base 12 of relative bottle 3 and deform it from the first to the second configuration.

In particular, plunger 31 has a substantially cylindrical main portion 32, which axially and slidingly engages a central through-hole 33 having axis E of rotating member 27 and is selectively displaceable between a first position (FIG. 2), in which it is spaced from base 12 of bottle 3 borne by resting element 21, and a second position (FIG. 3), in which it engages opening 30 of resting element 21 and has completed deformation of base 12 of bottle 3 to the second configuration.

Plunger 31 is axially coupled to a driving element 34 of an actuator assembly 35, in particular a linear motor 36.

According to a possible variant (not shown), plunger 31 may be directly defined by driving element 34 of actuator assembly 35.

According to another possible variant (not shown), plunger 31 may be driven by an electric motor of rotary type, coupled with a worm screw, in turn connected to the plunger 31 itself.

Actuator assembly 35 is arranged on the opposite side of electric motor 28 with respect to resting element 21.

In the case shown, actuator assembly 35 comprises an outer casing 37 which protrudes by means of a flanged sleeve 38 from a lower end 29b of stator 29, opposite to end 29a and provided with a through hole 29c.

Driving element 34 is partially engaged in a sliding manner along axis E in housing 37 and projects on top therefrom with an end portion coupled to plunger 31.

Preferably, plunger 31 is axially coupled to driving element 34 so that they can move as one single piece along axis E, and is rotationally free with respect to driving element 34 so that any rotational movement impressed by rotating member 27 to plunger 31 is not transmitted to the driving element 34 itself.

As may be seen in FIGS. 2 and 3, main portion 32 of plunger 31 engages hole 29c of end 29b of stator 29 and hole 33 of rotating member 27 in a sliding manner and ends on top with a head 40 which interacts with base 12 of the relative bottle 3.

It should be noted that, in the first position of plunger 31 (FIG. 2), head 40 is spaced from base 12 of the relative bottle 3 and is in particular located below the plane defined by resting surface 23, so as to not hamper feed or release of each bottle 3 to/from the relative operative unit 18.

In the second position of plunger 31, head 40 is coupled with central portion 16 of base 12 of the relative bottle 3.

To sum up, in the disclosed configurations of operative unit 18, stator 29, rotating member 27, resting element 21, actuator assembly 35 and plunger 31 move with rotating table 19 about axis A.

As shown in FIGS. 2 and 3, main portion 32 of plunger 31 has a splined zone 32a angularly coupled with rotating member 27; therefore, in addition to the rotational movement about axis A, rotating member 27, resting element 21 and plunger 31 can rotate about axis E with respect to the other components of operative unit 18.

Finally, plunger 31 and driving element 34 can translate along axis E with respect to the other components of operative unit 18.

With reference to FIGS. 2 to 4, machine 1 further comprises a control unit 41 configured to selectively activate actuator assembly 35 and electric motor 28 of each operative unit 18: in the first case, activation of one actuator assembly 35 produces displacement of the relative plunger 31 along its axis E from the first to the second position and vice versa; in the second case, activation of one electric motor 28 produces rotation of the relative plunger 31 and resting element 21 about axis E.

Control unit 41 advantageously comprises:
  measuring means 42 for measuring a physical quantity I correlated to the maximum deforming force F exerted by each plunger 31 on base 12 of the relative bottle 3 during the deformation operation of the base 12 itself in order to determine whether the bottle 3 is correctly filled; and comparator means 43 for comparing measured values $I_O$ of physical quantity I with a threshold value $I_V$ or a threshold range $I_R$ of the same physical quantity I.

On the basis of the above measures and comparisons, control unit 41 generates a reject signal R for rejecting the defective bottle 3 found on a given operative unit 18 when the measured value $I_O$ of physical quantity I differs from the threshold range $I_R$ or differs from the threshold value $I_V$ of a given amount.

In this way, it is possible to detect whether the bottles 3 are correctly filled, overfilled or filled below a predetermined level.

In the example shown, the reject signal R is generated by control unit 41 when the measured value $I_O$ of physical quantity I for a given operative unit 18 exceeds threshold value $I_V$ or threshold range $I_R$, so indicating that the relative bottle 3 is overfilled.

The measured physical quantity I is preferably the electrical current absorbed by each linear motor 36 during the deformation operation carried out on base 12 of a relative bottle 3.

FIG. 4 shows an example of an overfilled bottle 3 subjected to a deformation operation on its base 12 by a relative plunger 31.

Figure 5:
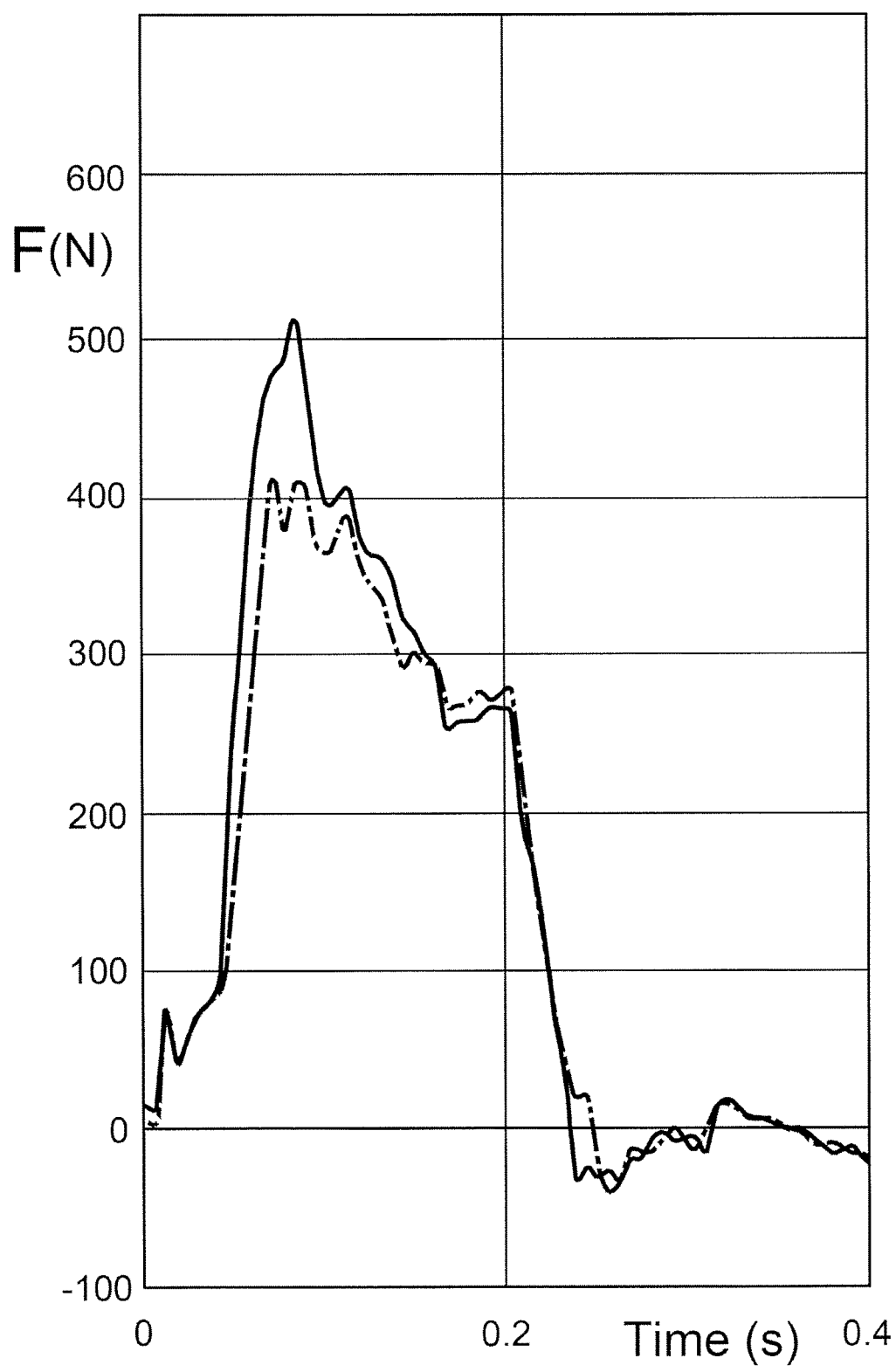
FIG. 5 is a graph showing the variation, in the course of time, of the deforming force applied on differently-filled containers by the operative unit of FIGS. 2 to 4 during the deformation operation.

The graph of FIG. 5 shows the variation, in the course of time, of the deforming force F applied on bases 12 of differently-filled bottles 3 by one operative unit 18 during the deformation operation. As clearly visible in such graph, the deforming force F required for a bottle 3 completely full (continuous line), like the one shown in FIG. 4, is on average 20% higher than the one required for a correctly filled bottle 3 (dot-and-dash line).

In use, after being filled with a hot pourable product, for example a liquid food product at about 85° C., capped with respective caps 17 and cooled in order to be taken at the desired temperature, bottles 3 sequentially reach the different operative units 18 of machine 1.

In particular, as known, by the effect of the capping operation, heated air present in the top portion of each bottle 3, between the product and relative cap 17, expands causing a stress that tends to produce a general swelling of bottle 3. During this step, bases 12 of bottles 3 are deformed assuming the first configuration shown in FIG. 2.

It may be noted, also in the above said first configuration, that central area 16 of base 12 of each bottle 3 does not project downwards beyond adjacent peripheral area 15; thereby, peripheral area 15 always ensures a stable support for the relative bottle 3.

During the subsequent cooling operation, depressive stresses are generated within bottles 3 and tend to shrink them.

At transfer station 7, inlet star wheel 6 feed bottles 3 to machine 1 in vertical positions, i.e. with axes D parallel to central axis A and coaxial to axes E of respective operating units 18.

In particular, each bottle 3 is arranged resting on plate 22 of a relative operating unit 18, centered within recess 22a and locked on top by head 24a of the relative retaining unit 24.

During the movement of bottles 3 from transfer station 7 to transfer station 9, control unit 41 sequentially activates respective actuator assemblies 35 so as to move respective plungers 31 from their first positions to their second positions and to cause deformation of bases 12 of bottles 3 from the first to the second configuration; in this way, depressive stresses acting within bottles 3 are cancelled.

In practice, considering a single operative unit 18, the activation of relative actuator assembly 35 causes the displacement along axis E of relative plunger 31 so that head 40 completely passes through opening 30 of relative resting element 21 and pushes central area 16 of base 12 of the relative bottle 3 upwards until it is taken to the second configuration. During this displacement of plunger 31, and therefore during the deformation operation on the base 12 of the relative bottle 3, head 24a of the corresponding retaining unit 24 is maintained at a constant distance along axis E from resting surface 23 of the resting element 21.

The maximum deforming force F exerted by plunger 31 on base 12 of the relative bottle 3 is measured by measuring means 42 of control unit 41 in order to check whether the bottle 3 itself is correctly filled.

In particular, maximum deforming force F is measured by detecting a correlated physical quantity I, in the example shown the electric current absorbed by linear motor 36 during the deformation operation.

More specifically, the measured values $I_O$ of physical quantity I are compared by comparator means 43 of control unit 41 with threshold value $I_V$ or threshold range $I_R$ of physical quantity I.

A reject signal R is generated by control unit 41 when the measured value $I_O$ of physical quantity I differs from threshold range $I_R$ or differs from threshold value $I_V$ of a given amount.

In the example shown, reject signal R is generated by control unit 41 when the measured value $I_O$ of physical quantity I exceeds threshold value $I_V$ or threshold range $I_R$, indicating that the bottle 3 involved in this measuring is overfilled (see FIG. 4 and continuous line in the graph of FIG. 5).

On the basis of reject signal R, the defective bottle 3 detected by control unit 41 is subsequently rejected, e.g. downstream of machine 1.

The deformation of base 12 produces an increase of the internal pressure of the relative bottle 3 as well as a consequent stiffening of the outer surface of the bottle 3 itself, which enables a very precise and accurate application of a relative label 2.

In particular, the labelling operation is performed immediately after the operation of deformation of base 12 of bottle 3.

More specifically, at the end of the deformation operation, plunger 31 is maintained in its second position (FIG. 3) and the bottle 3 is ready to receive the relative label 2.

In order to obtain winding of the label 2 on the relative bottle 3, control unit 41 activates electric motor 28 of relative operative unit 18; relative resting element 21 and plunger 31 are therefore rotated about axis E with a corresponding rotation of bottle 3 borne thereby; due to the particular coupling between plunger 31 and driving element 34, this latter element does not rotate.

The application of the label 2 on the relative bottle 3 is thus completed along the remaining portion of path P, until bottle 3 is fed to outlet wheel 10 at transfer station 11.

Prior to release bottles 3 to outlet wheel 10, plungers 31 are moved along axis E to their first positions, so as to not hamper the lateral displacement of bottles 3 towards outlet wheel 10.

As it appears from the above description, measuring the deforming force F applied by plungers 31 on the respective bottles 3 permits to obtain, in a reliable and repeatable manner, clear and immediate indications about correctness of the filling operations previously performed on such bottles 3 as well as about the quality of the bottles 3 themselves after the deformation operations.

These indications are achieved without complicating the operative units 18 by introducing additional sensors and connection thereof to the control unit 41, but simply measuring the electric current absorbed by actuator assemblies 35 for performing the deformation operations.

It should be also noted that machine 1 is configured to perform both the labelling operation of bottles 3 and the operation of transforming bases 12 of bottles 3 from the first to the second configuration. This is obtained without modifying the path normally performed by operative units 18 on a typical labelling machine and without any intervention on the sequence of the operations traditionally performed to apply labels 2 on bottles 3.

Furthermore, the adoption of machine 1 within a normal processing plant of bottles 3 allows to obtain, the same operations being performed, a reduction both of the number of machines employed and of the number of conveyors for transferring the above said bottles 3 from a machine to another. This also translates into a significant reduction of the overall space occupied by the resulting processing plant with respect to the known plants.

Finally, it is clear that modifications and variants to machine 1 and the method disclosed and shown herein can be made without departing from the scope of protection as defined in the accompanying claims.

The invention claimed is:

1. A container handling machine, the machine comprising:
   a container transport carousel having a rotating table defining a transport path;
   at least one operative unit connected to the carousel for handling a container having a base;
   a first motor coupled to the rotating table and having a rotating member provided with a through hole;
   a first support unit provided with an opening and connected to the rotating member to support the base of the container;
   a second support unit configured to cooperate with an end of the container opposite the base;
   a plunger configured to selectively move along a longitudinal axis to deform the base of the container from a first configuration, in which the base is in an enlarged state and defines a first internal volume of the container, to a second configuration, in which the base is at least in part inwardly retracted with respect to the first configuration so as to define a second internal volume of the container that is smaller than in the first internal volume of the first configuration;
   a second motor configured to selectively move the plunger through the opening of the first support unit and the through hole of the rotating member along the longitudinal axis between a first position, in which the plunger is detached from the base of the container, and a second position, in which the plunger deforms the base to the second configuration of the base, wherein the second support unit is maintained at a constant distance along the longitudinal axis from the first support unit when the base is deformed;
   a control unit configured to selectively actuate the second motor to move the plunger along the longitudinal axis between the first position and the second position, and to selectively actuate the first motor for rotating the first support unit; and
   a labelling unit configured to apply a label onto an outer surface of the container while the at least one operative unit and the container are moved by the carousel along the transport path transverse to the longitudinal axis, while the first motor is actuated by the control unit for rotating the first support unit and the container supported thereon about the longitudinal axis, during application of the label onto the container,
   wherein the control unit is further configured to measure an electric current absorbed by the second motor when the base of the container is deformed as part of a determination of whether the container is filled.

2. The machine of claim 1, wherein the control unit includes a comparator unit configured to compare the measured value of electric current with a threshold value or a threshold range of electric current.

3. The machine of claim 2, wherein the control unit is configured to generate a reject signal for rejecting the container when the measured value of electric current differs from the threshold range or differs from the threshold value.

4. The machine of claim 3, wherein the reject signal is generated by the control unit when the measured value of electric current exceeds the threshold value or the threshold range, indicating that the container is overfilled.

5. A container handling machine, the machine comprising:
   a container transport carousel having a rotating table defining a transport path;
   at least one operative unit connected to the carousel for handling a container having a base;
   a first motor coupled to the rotating table and having a rotating member provided with a through hole;
   a first support unit provided with an opening and connected to the rotating member to support the base of the container;
   a second support unit configured to cooperate with an end of the container opposite the base;
   a plunger configured to selectively move along a longitudinal axis to deform the base of the container from a first configuration, in which the base is in an enlarged state and defines a first internal volume of the container, to a second configuration, in which the base is at least in part inwardly retracted with respect to the first configuration so as to define a second internal volume of the container that is smaller than in the first internal volume of the first configuration;
   a second motor configured to selectively move the plunger through the opening of the first support unit and the through hole of the rotating member along the longitudinal axis between a first position, in which the plunger is detached from the base of the container, and a second position, in which the plunger deforms the base to the second configuration of the base, wherein the second support unit is maintained at a constant distance along the longitudinal axis from the first support unit when the base is deformed;
   a control unit configured to selectively actuate the second motor to move the plunger along the longitudinal axis between the first position and the second position, and to selectively actuate the first motor for rotating the first support unit, the control unit including:
      a measuring unit configured to measure electric current absorbed by the second motor during actuation of the second motor to move the plunger along the longitudinal axis between the first position and the second position; and
      a comparator unit configured to compare a measured value of electric current absorbed by the second motor with a threshold value for enabling an automated check of the deformation of the base of the container; and a labelling unit configured to apply a label onto an outer surface of the container while the at least one operative unit and the container are moved by the carousel along the transport path transverse to the longitudinal axis, while the first motor is actuated by the control unit for rotating the first support unit and the container supported thereon about the longitudinal axis, during application of the label onto the container.

6. The machine of claim 5, wherein the control unit is configured to generate a reject signal for rejecting the container when the measured value differs from the threshold value.

7. The machine of claim 6, wherein the reject signal is generated by the control unit when the measured value exceeds the threshold value, indicating that the container is overfilled.

8. A container handling machine, the machine comprising:
- a container transport carousel having a rotating table defining a transport path;
- at least one operative unit connected to the carousel for handling a container having a base;
- a rotating member provided with a through hole;
- a device configured to impart rotation to the rotating member;
- a first support unit provided with an opening and connected to the rotating member to support the base of the container;
- a second support unit configured to cooperate with an end of the container opposite the base;
- a plunger configured to selectively move along a longitudinal axis to deform the base of the container from a first configuration, in which the base is in an enlarged state and defines a first internal volume of the container, to a second configuration, in which the base is at least in part inwardly retracted with respect to the first configuration so as to define a second internal volume of the container that is smaller than in the first internal volume of the first configuration;
- a motor configured to selectively move the plunger through the opening of the first support unit and the through hole of the rotating member along the longitudinal axis between a first position, in which the plunger is detached from the base of the container, and a second position, in which the plunger deforms the base to the second configuration of the base, wherein the second support unit is maintained at a constant distance along the longitudinal axis from the first support unit when the base is deformed;
- a control unit configured to selectively actuate the motor to move the plunger along the longitudinal axis between the first position and the second position, and to selectively actuate the device for imparting rotation to the rotating member for rotating the first support unit; and
- a labelling unit configured to apply a label onto an outer surface of the container while the at least one operative unit and the container are moved by the carousel along the transport path transverse to the longitudinal axis, while the device for imparting rotation to the rotating member is actuated by the control unit for rotating the first support unit and the container supported thereon about the longitudinal axis, during application of the label onto the container,
- wherein the control unit is further configured to measure an electric current absorbed by the second motor when the base of the container is deformed as part of a determination of whether the container is filled.

9. The machine of claim 8, wherein the control unit includes a comparator unit configured to compare the measured value of electric current with a threshold value or a threshold range of electric current.

10. The machine of claim 9, wherein the control unit is configured to generate a reject signal for rejecting the container when the measured value of electric current differs from the threshold range or differs from the threshold value.

11. The machine of claim 10, wherein the reject signal is generated by the control unit when the measured value of electric current exceeds the threshold value or the threshold range, indicating that the container is overfilled.

* * * * *